(12) United States Patent
Varghese

(10) Patent No.: US 12,276,818 B2
(45) Date of Patent: Apr. 15, 2025

(54) PLANARIZED PATTERNED OPTICAL THIN FILM COATINGS

(71) Applicant: Ron Varghese, Albuquerque, NM (US)

(72) Inventor: Ron Varghese, Albuquerque, NM (US)

(73) Assignee: Ron Varghese, Morganville, NJ (US)

( * ) Notice: Subject to any disclaimer, the term of this patent is extended or adjusted under 35 U.S.C. 154(b) by 405 days.

(21) Appl. No.: 17/573,726

(22) Filed: Jan. 12, 2022

(65) Prior Publication Data

US 2022/0236462 A1    Jul. 28, 2022

Related U.S. Application Data

(60) Provisional application No. 63/199,794, filed on Jan. 26, 2021.

(51) Int. Cl.
*G02B 5/20* (2006.01)

(52) U.S. Cl.
CPC .................... *G02B 5/201* (2013.01)

(58) Field of Classification Search
CPC ..................................................... G02B 5/201
See application file for complete search history.

(56) References Cited

U.S. PATENT DOCUMENTS

| | | | | |
|---|---|---|---|---|
| 7,121,669 | B2 * | 10/2006 | Iisaka | G02B 5/201 353/31 |
| 7,166,489 | B2 * | 1/2007 | Kim | H01L 27/14685 438/69 |
| 10,534,276 | B1 * | 1/2020 | Yang | G03F 7/70683 |
| 2012/0327347 | A1 * | 12/2012 | Cho | G02F 1/133509 349/190 |

FOREIGN PATENT DOCUMENTS

EP        2541602 A1 *  1/2013  .......... H01L 27/3211

* cited by examiner

*Primary Examiner* — Jeffry H Aftergut

(57) ABSTRACT

The use of a planarization layer between each micro patterned optical coating on an active or passive substrate to improve spectral performance of optical filter arrays that can be applied directly on an image sensor pixel array or on glass substrate which can be later aligned & bonded over an image sensor and can also be patterned into convex or concave micro-lens over the whole CFA and function as a light focusing layer is disclosed.

5 Claims, 9 Drawing Sheets

3D view

2D TOP view 40
50
60
70

PLANARIZED PATTERNED OPTICAL THIN FILM COATINGS

CROSS REFERENCE TO RELATED APPLICATION

The present application claims the benefit of previously filed co-pending Provisional Patent Application, Ser. No. 63/199,794, filed on Jan. 26, 2021.

FIELD OF THE INVENTION

This invention belongs to the field of optical thin film coatings. More specifically it is a process using a planarization layer between each patterned thin film optical coating prior to creating the next patterned thin film optical coating. Doing so, minimizes topology induced shadowing and the spectral leakage and cross-talk of the patterned deposited optical filters.

BACKGROUND OF THE INVENTION

Micro-patterned Optical thin film coatings have different optical properties than a simultaneously deposited blanket unpatterned film stack. The latter film stack performance is closer to that of the theoretically designed optical filter. To pattern the dichroic or interference color filter arrays (CFA), a photoresist is used in liftoff or in spin coat and etch mode. In Liftoff processing, with each subsequent patterned layer depiction, thicker resist has to be used to ensure ample coverage over topology and this adds to the line of sight (shadow) effects of the color filter thin film deposition. With the line-of-sight deposition and topology induced non-uniformity of the individual thin films, the following issues arise—1) Spectrum shift and leakage (with micro patterning, the average thickness is thinner than that for a blanket deposition) of the filter pass or blocking bands respectively, 2) Neighbor Color filter shadow effects—spectral shift with aspect ratio (height to width) of patterned color filter film stack. The aspect ratio is defined by pixel size, filter thickness and the photoresist thickness (the resist if liftoff processing is employed for CFA patterning). For example, in a 2×2 color filter array, with the addition each filter layer, the Neighbor Color filter shadow effect increases until the last filter to be deposited is shadowed by all the neighboring filters—2nd filter has shadow effect from the first, the 3rd from the 1st and 2nd, the 4th from the 1st, 2nd and 3rd. Therefore, for any type of m×n array, each subsequent filter layer deposited will experience shadow effects from previously deposited neighboring micro-patterned filters. The shadowing causes the as-deposited thin film thicknesses to be non-conformal and non-uniform across the color filter area and mostly thinner than the as-designed thickness. These issues are especially amplified in multispectral and hyperspectral filter arrays where the color filter count can be greater than the typical 4 count of a Bayer color filter array.

Employing a planarizing layer after each micro-patterned filter layer, ensures that thinner photoresist can be used at each subsequent filter layer and better lithography definition for micro patterning and ensures vertical separation between each filter layer. Even partial planarization, ensures less thickness of photoresist used whilst also ensuring that each neighboring filter is only partially vertically separated from each other—doing so will ensure less unfiltered light leakage between color filters. Such planarization layers have been used in Display projection (Iisaka (U.S. Pat. No. 7,121,669) for improving dry etch patterning selectivity and in CMOS image sensors for improving co-planarity of color filters (Kim et.al. U.S. Pat. No. 7,341,885, Wake et.al. U.S. Pat. No. 6,297,071), improve spectral response of image sensor (Walschap et.al. U.S. patent application Ser. No. 20/050,110050A1) or for micro-lens focal length optimization (Kim et.al. U.S. Pat. No. 7,767,481, Kim U.S. Pat. No. 7,166,489). In all these prior arts, the planarizing layer is either used as an etch process improving interlayer or used as single layer to improve co-planar color filter arrays (CFA) directly placed on image sensors. This invention introduces the use of a planarizing layer between each color filter layer in a CFA which sacrifices co-planarity of the color filter array (non-planar CFA) for better spectral performance. This invention's multi-level planarized CFA can be applied directly on an image sensor pixel array or on glass substrate which can be later aligned & bonded over an image sensor. The same planarizing layer can also be patterned into convex or concave micro-lens over the whole CFA and function as a light focusing layer.

By using the planarization process disclosed in this application the prior art's limitations described above can now be overcome.

BRIEF SUMMARY OF THE INVENTION

The invention of this disclosure is methods and related advantages to use of a planarizing layer between micro patterned color filter arrays or dichroic filter layers. The multi-level planarized CFA can be applied directly on an image sensor pixel array or on glass substrate which can be later aligned & bonded over an image sensor. The same planarizing layer can also be patterned into convex or concave micro-lens over the whole CFA and function as a light focusing layer.

BRIEF DESCRIPTION OF THE DRAWINGS

For a fuller understanding of the nature and objects of the invention, reference should be made to the following detailed description, taken in connection with the accompanying drawings, in which the use of a planarizing layer at multiple levels of a CFA is demonstrated:

FIG. 2A depicts a co-planar color filter array (CFA) on glass aligned and bonded to an Image sensor and FIG. 2B shows a similar co-planar color filter array (CFA) deposited directly on an Image sensor. Both figures show the inter pixel spectral leakage of a typical micro patterned optical filter array despite having a dark or light blocking grid.

FIG. 3B is the same as FIG. 3A but with an additional top planarizing layer.

FIG. 5C is fully and FIG. 5D is partially planarized. FIG. 5E is fully and FIG. 5F is partially planarized.

DESCRIPTION OF THE PREFERRED EMBODIMENT

The preferred embodiment of this method discloses that by using a planarizing layer between micro patterned optical coatings or layers decreases spectrum shift, spectral leakage and cross-talk of each optical coating.

Details of each step in the proposed processing method are disclosed below. The steps to create the micro-patterned CFA in FIGS. 3-5 is similar to that for the prior art non-planarized CFA in FIG. 2. However, FIGS. 3-5 include the additional processing required to interleave each color filter layer with a planarizing layer. The steps for a partially planarized CFA shown in FIG. 4 and FIG. 5 are the same as that for the fully planarized with the exception that there is only partial conformal planarization between each color filter layer. This is achieved by applying less thickness of planarizing thin films.

The table below is the legend for the attached Figures.

| | |
|---|---|
| 10 | Image Sensor |
| 20 | Glass substrate |
| 30 | Inter-level Dielectrics |
| (40) | Red |
| (50) | Green |
| (60) | Blue |
| (70) | NIR |
| (80) | IR Cut Filter |
| (90) | Light Blocker |
| (100) | Planarizing Layer |
| (110) | Lens |

Figure 1A:
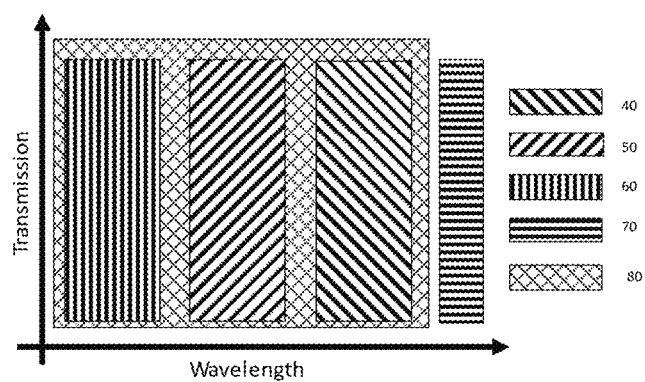
FIG. 1A is a diagram showing the as-designed or blanket coated RGB filter array's spectral performance—transmission vs. wavelength. Also shown are the IR cut filter and Near Infra-Red (NIR) band filters.
Figure 1B:
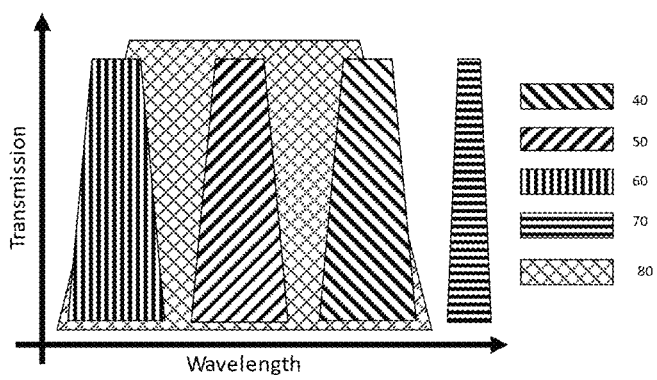
FIG. 1B is a diagram showing the micro-patterned RGB filter array's spectral performance—transmission vs. wavelength. Also shown are the IR cut filter and NIR band filters.
Figure 1C:
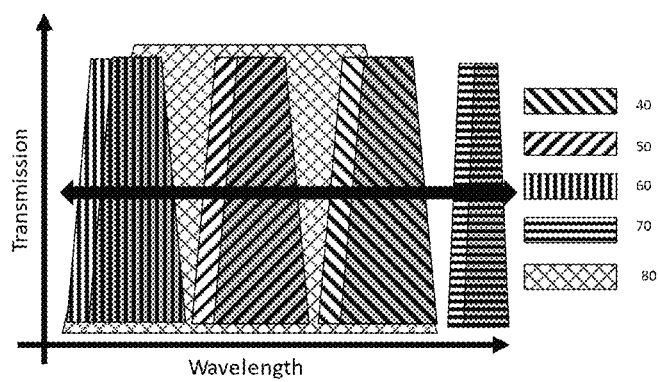
FIG. 1C is a diagram showing the micro patterned 1) shadow effect 2) AOI induced blue or red shift of the RGB filter array's spectral performance—transmission vs. wavelength. Also shown are the IR cut filter and NIR band filters.
Figure 1D:
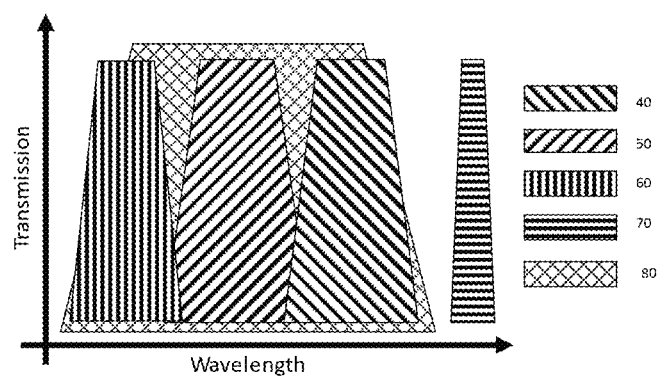
FIG. 1D is a diagram showing the spectral cross-talk (overlapping of colors) of a micro patterned shadow effect induced RGB filter array's spectral performance—transmission vs. wavelength. Also shown are the IR cut filter and NIR band filters.
Figure 2A:
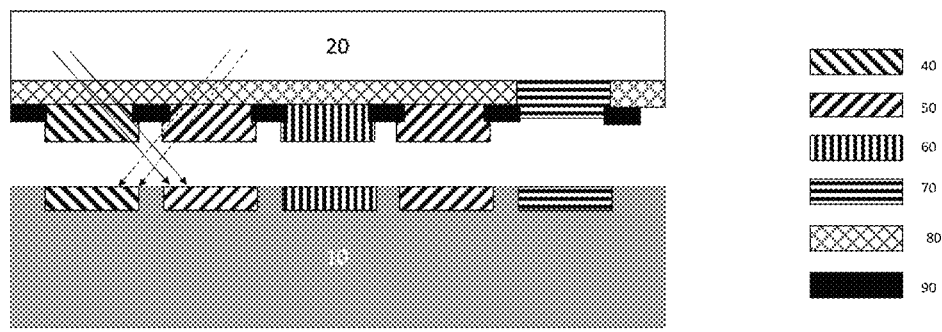
FIGS. 2A-2B show a typical (prior art) micro patterned RGB+NIR color filter array with a dark or light blocking grid covering the periphery of each filter and a patterned band pass filter common only to specific filters in the array.
Figure 2B:
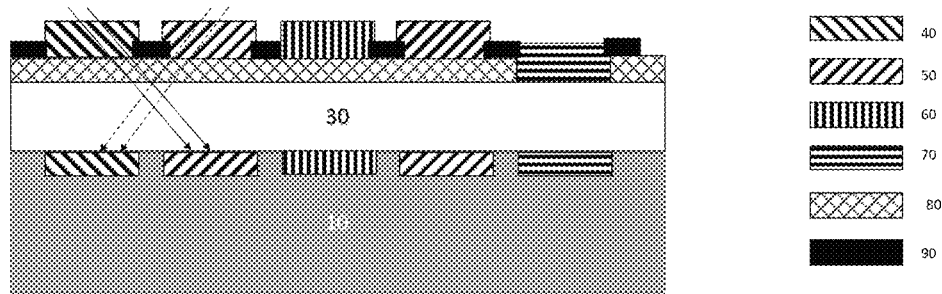
Figure 2C:
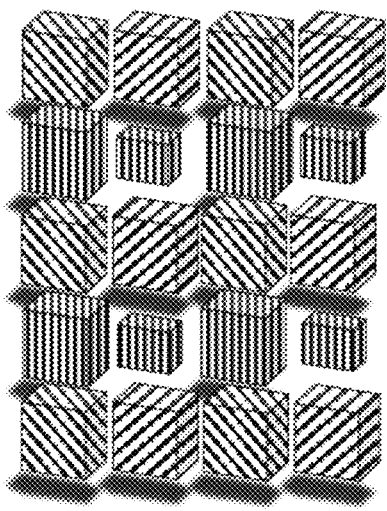
FIG. 2C shows the effect on 4th color filter aspect ratio (height to width ratio) due to "shadow" induced by 3 neighboring color filters deposited earlier.
Figure 2C:
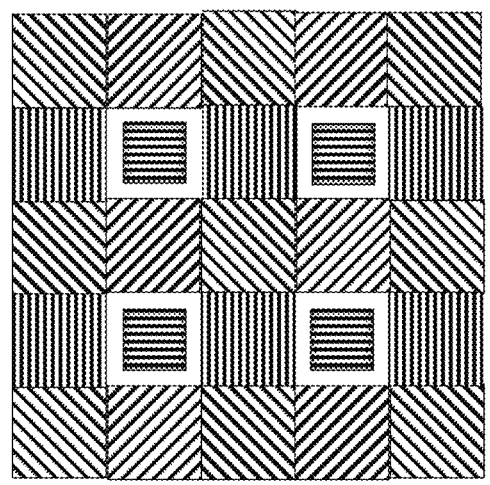
Figure 2C:
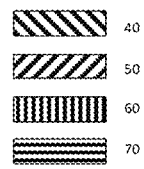

In FIG. 2A (prior art) a Red (40), Green (50), Blue (60) and NIR (70) CFA on glass substrate (20) is shown aligned over and bonded (bond not shown) over the corresponding pixels of an Image Sensor (10). The CFA consists of a Red (40), Green (50), Blue (60) and (70) NIR (near infra-red). The RGB colors have a visible color passing and IR blocking filter under them. There is also a light blocking grid (90) around each color. In FIG. 2B (prior art) a Red (40), Green (50), Blue (60) and NIR (70) CFA directly on Inter-level Dielectrics (30) of an Image sensor (10) is shown. FIG. 2C shows the effect on 4th NIR filter (70) aspect ratio (height to width ratio) due to "shadow" induced by 3 neighboring color filters, Red (40), Green ((50)), Blue (60), deposited earlier. Please note that for ease of understanding and visualization, the shadow effects on other 2 out of 4 color filters are not shown but it will be obvious to those skilled in the art, that the 1st filter deposited will have the least shadow effect and with each subsequent color filter deposited, the shadow effects increase on the filter being deposited and patterned.

Figure 3A:
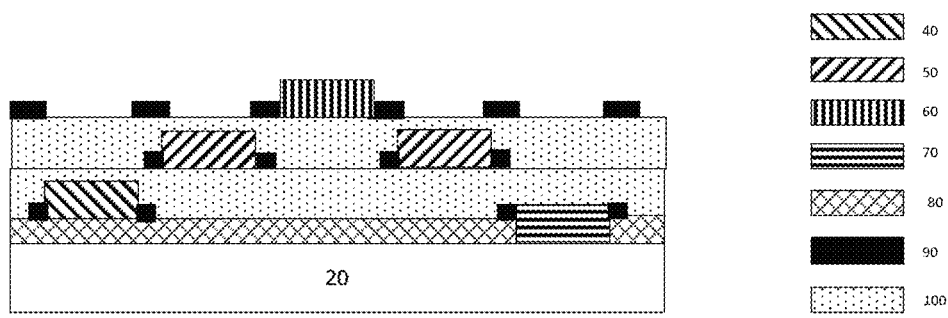
FIGS. 3A-3B show the first preferred embodiment of this disclosure—a fully planarized micro patterned optical filter array with dark or light blocking thin film around each filter (similar to FIG. 2).
Figure 3B:
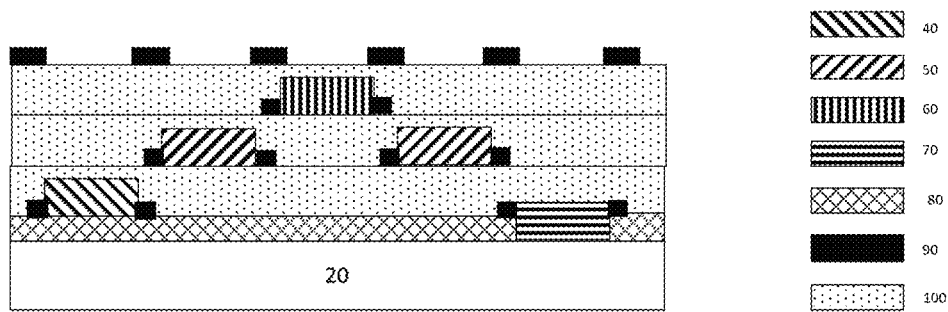

FIGS. 3A-3B show the first preferred embodiment of this disclosure—a fully planarized (2 planarizing layers (100)) micro patterned Red (40), Green (50), Blue (60) and NIR (70) CFA on glass substrate (20) with dark or light blocking thin film (90) around each filter (similar to FIG. 2). FIG. 3B is the same as FIG. 3A but with an additional top planarizing layer (100). In both figures, there is a plurality of dark thin film light blocker grids (90) that are around each color filter and above the CFA. It is understood by those experienced in the field that the use of one or multiple dark grids (90) are dependent on the application and spectral performance required therein. The use of dark thin film grids (90) decreases AOI induced spectral cross-talk. These figures show Red (40), Green (50), Blue (60) and NIR (70) CFA on glass substrate (20) but an equivalent CFA on image sensor (10) can be envisioned.

Figure 4A:
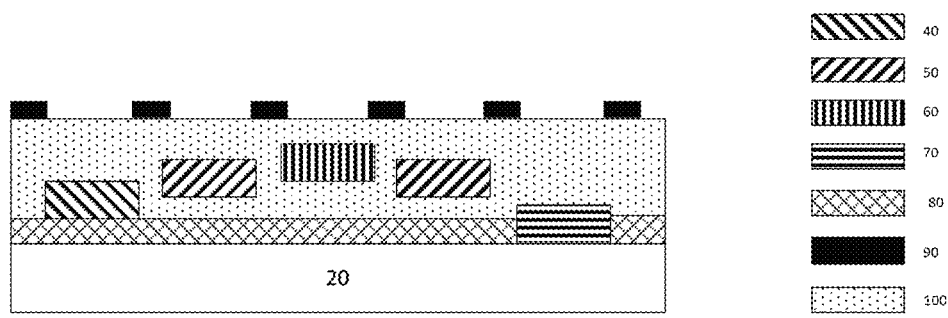
FIG. 4A shows the second preferred embodiment of this disclosure—a partially planarized micro patterned optical filter array with dark or light blocking thin film (similar to FIG. 2 and FIG. 3).
Figure 4B:
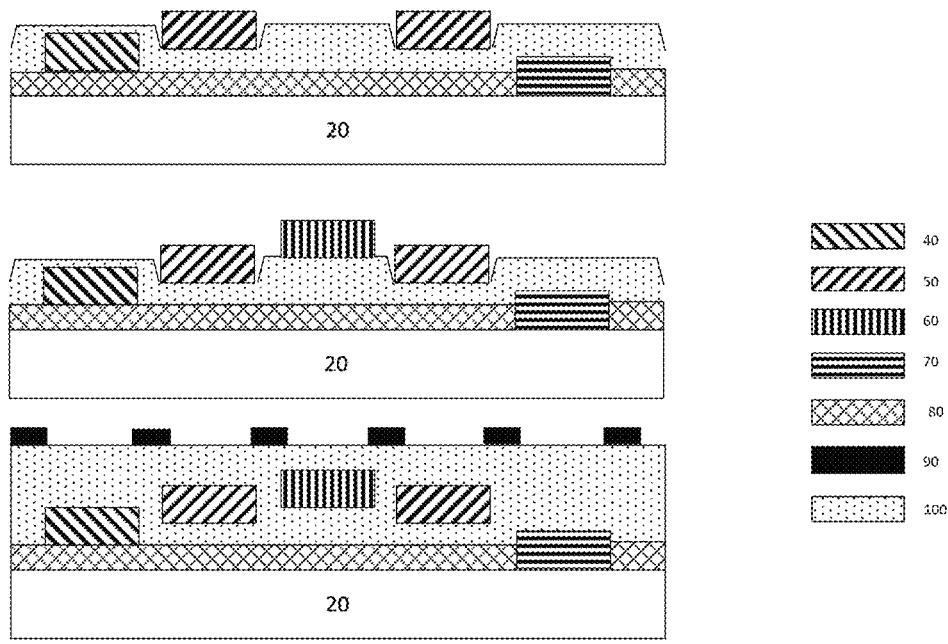
FIG. 4B shows the partial planarizing employed between each color filter layer. Like in FIG. 3, a plurality of dark thin film grids that are either around each color filter on above or below the CFA can also be envisioned.

FIG. 4A shows the second preferred embodiment of this disclosure—a partially planarized (2 planarizing layers (100)) micro patterned Red (40), Green (50), Blue (60) and NIR (70) CFA on glass substrate (20) with dark or light blocking thin film (90) around each filter (similar to FIG. 2 and FIG. 3). FIG. 4B shows the sequence of steps where a thin planarizing layer (100) is deposited after the Red (40) and NIR (70) and a $2^{nd}$ thin planarizing layer (100) after Green (50) and Blue (60) micro-patterning. Like in FIG. 3, a plurality of dark thin film grids (90) that are either around each color filter on above or below the CFA can also be envisioned. It is understood by those experienced in the field that the use of one or multiple dark grids (90) are dependent on the application and spectral performance required therein. These figures show Red (40), Green (50), Blue (60) and NIR (70) CFA on glass substrate (20) but an equivalent CFA on image sensor (10) can be envisioned.

Figure 5A:
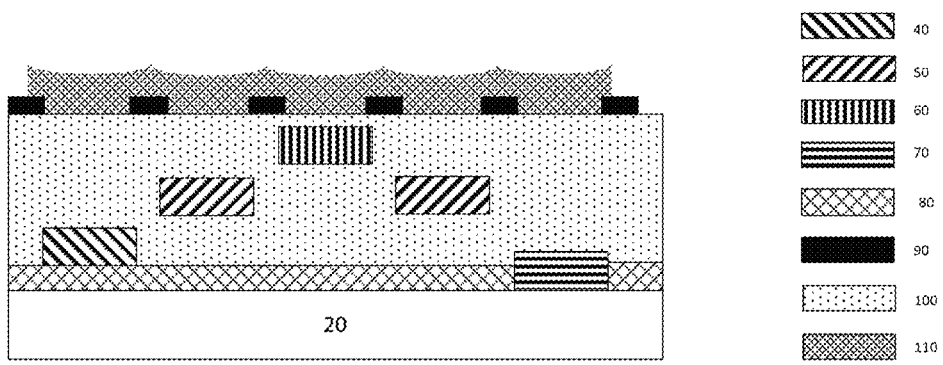
FIGS. 5A-5B show planarized micro patterned color filter arrays of FIG. 3 and FIG. 4 with a micro lens over the top of the CFA.
Figure 5B:
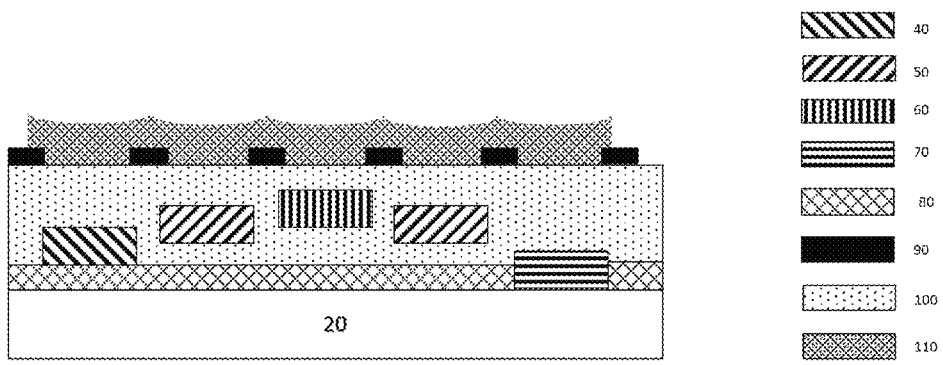
Figure 5C:
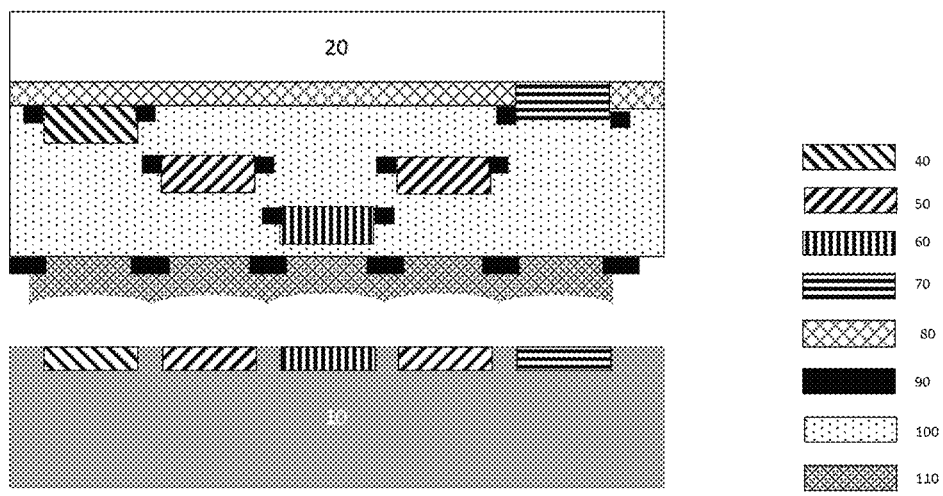
FIGS. 5C-5D show plano-concave micro-lens covered planarized CFA on glass aligned and bonded over an Image sensor.
Figure 5D:
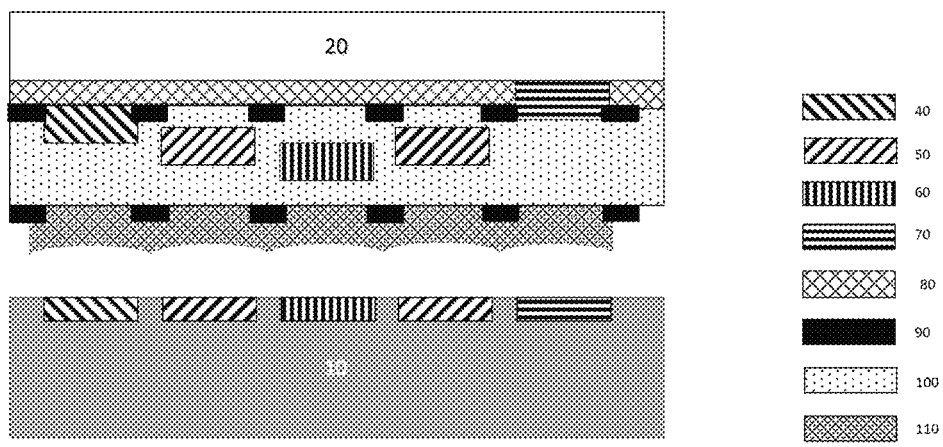
Figure 5E:
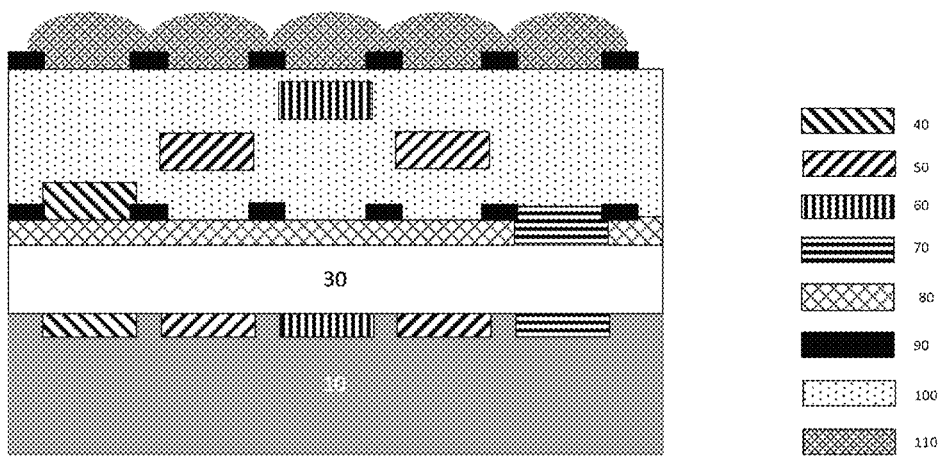
FIGS. 5E-5F show plano-convex micro-lens covered planarized CFA directly on an Image sensor.
Figure 5F:
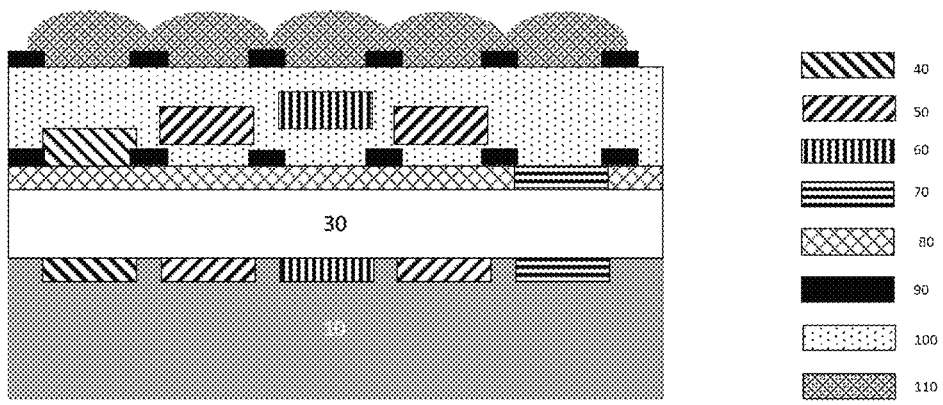

FIG. 5A shows a fully planarized micro patterned Red (40), Green (50), Blue (60) and NIR (70) CFA on glass 20 of FIG. 3 and FIG. 4 with a plano-concave micro lens ((110)) over the top of the CFA. FIG. 5B shows partially planarized micro patterned Red (40), Green (50), Blue (60) and NIR (70) CFA on glass 20 of FIG. 3 and FIG. 4 with a plano-concave micro lens ((110)) over the top of the CFA. FIGS. 5C-5D show plano-concave micro-lens covered planarized micro patterned Red (40), Green (50), Blue (60) and NIR (70) CFA on glass substrate (20) aligned and bonded over an Image sensor. FIG. 5C is fully and FIG. 5D is partially planarized. FIGS. 5E-5F show plano-convex micro-lens covered planarized Red (40), Green (50), Blue (60) and NIR (70) CFA directly on an Image sensor (10). FIG. 5E is fully and FIG. 5F is partially planarized. A concave lens is used to focus the light that is transmitted through the CFA that has been flipped, aligned and bonded to an Image sensor (10) and therefore, conversely, a convex lens is used over the CFA when the micro-patterned CFA is directly deposited over an Image sensor (10).

Without planarization, there is spectral cross-talk of each color filter into the neighboring image sensor pixel instead of the underlying vertically aligned image sensor pixel.

Often a dark or light blocking layer is applied on the periphery of color filters as a grid to decrease cross talk. With planarization, the cross-section of the optical filter stack has more uniform thickness across its z-axis and less shadow effects from neighboring patterned filter stacks. Therefore, the spectrum shift observed between an as-designed blanket color filter and micro patterned color filter is also minimized. In addition, to prevent spectral leakage (where the blocking band 'leaks') within each color filter, the blocking band of the dichroic or interference filters also require as-deposited layer thicknesses be matched as much as possible to as-designed layer thicknesses. Thus, along with the as-deposited pass band thicknesses to be as close to that as-designed, the blocking band thicknesses have to be close to as-designed to prevent spectral leakage.

Planarization, even partial, of a stack of optical filters ensure that at high angle of incidence (AOI) of light, most of the leakage of color from one filter is into another filter (which often blocks other colors) and not directly into the neighboring image sensor pixel. At extreme AOI on color filters furthest away from the sensor, a color filter dedicated dark frame around the color filter or 2 (one on top of CFA and the other at the bottom) patterned dark grid may be required to prevent spectral leakage. If full planarization is employed between color filter layers, then the planarization layer thickness between each CFA layer has to be optimized to ensure ample planarity whilst achieving acceptable AOI induced spectral leakage. Partial planarization permits the color filter layers to have some overlap on the horizontal plane and that minimizes the spectral cross-talk between colors.

In addition, same planarizing material can be used to create micro-lens that will focus light into the underlying vertically aligned image sensor pixel—ease of wafer level micro-lens integration.

A common alignment approach of CFA glass to Image sensors is to maximize the pixel response of each color of a CFA—that is, for example, by simultaneously maximizing the spectral response for blue color in an image sensor pixel, red in neighboring image sensor pixel, green in the adjacent image sensor pixel, etc. the CFA glass is aligned to image sensor pixel array. With planarization and the lesser spectral cross-talk, the alignment of the patterned optical filter (color filter array) glass to a spectral detector or image sensor pixel array is also easier achieved.

The advantages of this technique of adding a planarization layer are that it can be performed using current self-planarizing processing methods with either use of spin-on chemicals, dielectrics and/or photo-patternable dielectrics and may include a post deposition chemical mechanical polishing (CMP) step. When using photo-patternable planarizing thin films, additional patterning can be also conducted on the planarizing film to provide openings to underlying layers, create micro-lens or locally planarize using gray scale lithography, micro-patterned diffractive lens, to name just a few novel capabilities.

Since certain changes may be made in the above described planarized micro patterned optical coating process without departing from the scope of the invention herein involved, thus it is intended that all matter contained in the description thereof or shown in the accompanying figures shall be interpreted as illustrative of the claims and not in a limiting sense.

What is claimed is:

1. A method of constructing a color filter array having two or more color filter layers comprising:
    forming a stack of the two or more color filter layers with a planarizing [using a self-planarizing] layer between each color filter layer [in said color filter layer] wherein each planarizing layer ensured vertical separation and buildup integrity of each color filter layer in the stack.

2. The method of constructing a color filter array of claim 1 further comprising:
    said color filter array applied on an image sensor pixel array.

3. The method of constructing a color filter array of claim 1 further comprising:
    said color filter array applied on a glass substrate; and, then aligning and bonding said combined glass substrate and color filter array over an image sensor pixel array.

4. The method of constructing a color filter array of claim 2 further comprising:
    said color filter array having planarizing layers also being patterned into a convex or concave micro-lens; and, then placing said patterned convex or concave micro-lens over said color filter array applied on said image sensor pixel array to function as a light focusing layer.

5. The method of constructing a color filter array of claim 3 further comprising:
    said color filter array having planarizing layers also being patterned into a convex or concave micro-lens; and, then placing said patterned convex or concave micro-lens over said color filter array applied on a glass substrate to function as a light focusing layer.

* * * * *